(12) United States Patent
Oh

(10) Patent No.: US 11,537,775 B1
(45) Date of Patent: Dec. 27, 2022

(54) TIMING AND PLACEMENT CO-OPTIMIZATION FOR ENGINEERING CHANGE ORDER (ECO) CELLS

(71) Applicant: Synopsys, Inc., Mountain View, CA (US)

(72) Inventor: Nahmsuk Oh, Palo Alto, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 17/176,987

(22) Filed: Feb. 16, 2021

Related U.S. Application Data

(60) Provisional application No. 62/978,213, filed on Feb. 18, 2020.

(51) Int. Cl.
*G06F 30/392* (2020.01)
*G06F 30/398* (2020.01)
*G06F 30/394* (2020.01)
*G06F 119/12* (2020.01)

(52) U.S. Cl.
CPC ......... *G06F 30/392* (2020.01); *G06F 30/394* (2020.01); *G06F 30/398* (2020.01); *G06F 2119/12* (2020.01)

(58) Field of Classification Search
USPC ....................................................... 716/110
See application file for complete search history.

(56) References Cited

U.S. PATENT DOCUMENTS

| | | | |
|---|---|---|---|
| 2009/0178013 A1* | 7/2009 | Wang | G06F 30/394 716/132 |
| 2014/0258957 A1* | 9/2014 | Jiang | G06F 30/39 716/114 |
| 2021/0097224 A1* | 4/2021 | Lin | G06F 30/3953 |

* cited by examiner

*Primary Examiner* — Mohammed Alam
(74) *Attorney, Agent, or Firm* — Fenwick & West LLP

(57) ABSTRACT

A system and method for providing timing and placement co-optimization for engineering change order (ECO) cells is described. According to one embodiment, an ECO for a current design of an integrated circuit is accessed. The ECO includes inserting an ECO cell among placed and routed current cells of the current design. A target region in the current design is identified for placement of the ECO cell, but the target region has insufficient open space to place the ECO cell. At least one current cell will have to be moved in order to place the ECO cell in the target region. Timing slacks for current cells in a neighborhood of the target region are determined. Based on the timing slacks of the current cells, at least one of the current cells is moved to a different location to create sufficient open space to place the ECO cell within the target region.

20 Claims, 13 Drawing Sheets

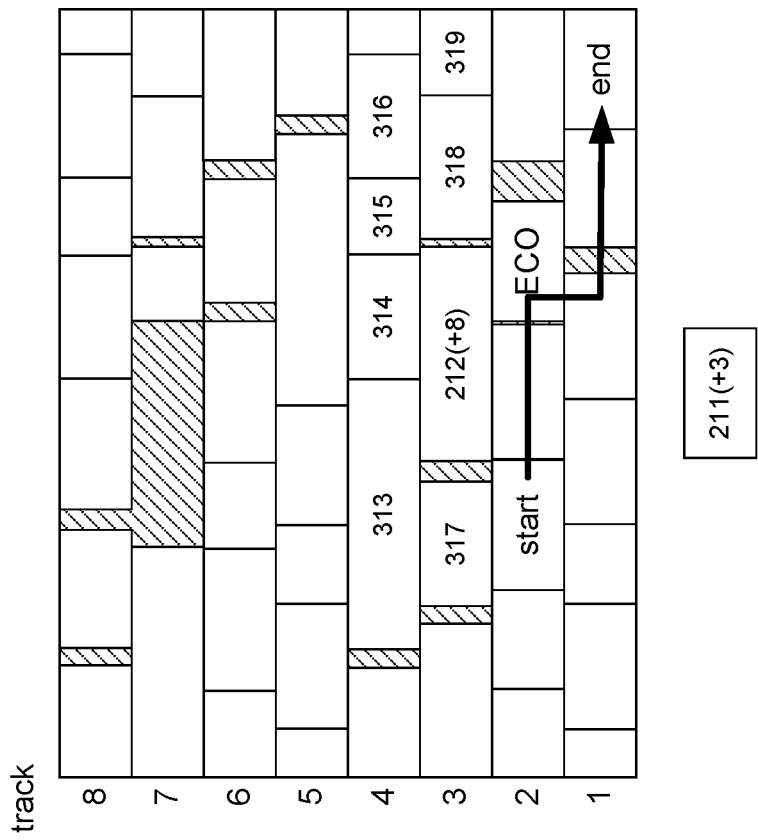
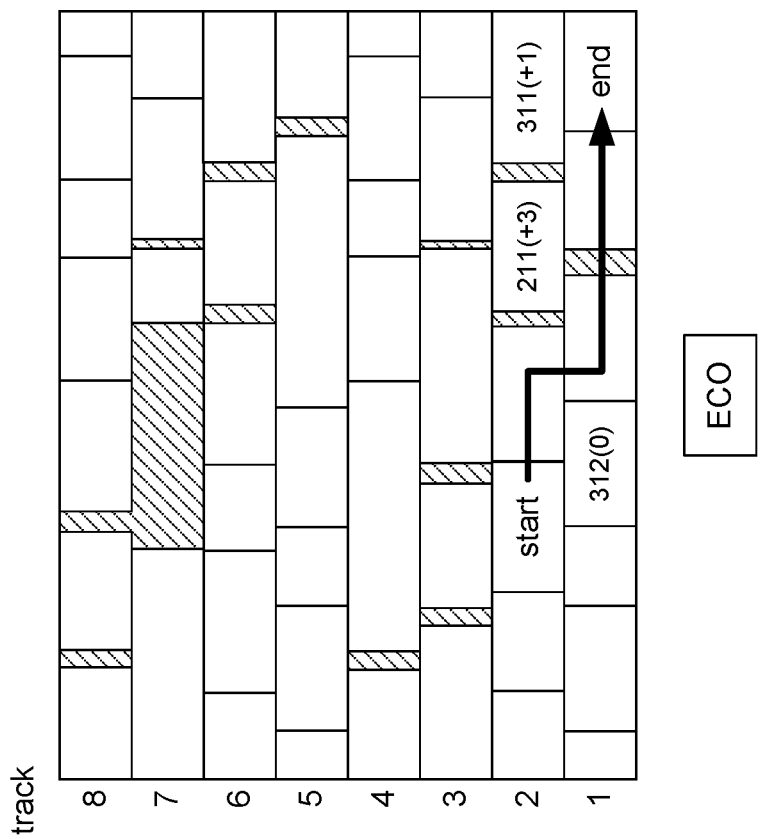
FIG. 3A
FIG. 3B

TIMING AND PLACEMENT CO-OPTIMIZATION FOR ENGINEERING CHANGE ORDER (ECO) CELLS

RELATED APPLICATION

This application claims the benefit of U.S. Provisional Application No. 62/978,213, "Timer and Placer Co-optimization for Timing Slack Based ECO Cell Placement", filed Feb. 18, 2020, which is incorporated by reference in its entirety.

TECHNICAL FIELD

The present disclosure generally relates to an electronic design automation (EDA) system. In particular, the present disclosure relates to a system and method for providing timing and placement co-optimization for engineering change orders (ECOs) in the design of integrated circuits.

BACKGROUND

Engineering change orders (ECOs) are a step in the design of integrated circuits. ECOs are additions or changes to an integrated circuit design that occur late in the design process. Most of the integrated circuit may already be completed or nearly completed, meaning that most of the integrated circuit is already laid out (placed and routed) and most requirements (constraints) on the design have already been satisfied when an ECO request is made. For example, ECOs may be used to fix remaining timing violations in the design.

SUMMARY

In certain embodiments, a method includes the following steps. An engineering change order (ECO) for a current design of an integrated circuit is accessed. The ECO includes inserting an additional cell (the ECO cell) among placed and routed current cells of the current design. A target region in the current design is identified for placement of the ECO cell, but the target region has insufficient open space to place the ECO cell. At least one current cell will have to be moved in order to place the ECO cell in the target region. Timing slacks for current cells in a neighborhood of the target region are determined. Based on the timing slacks of the current cells, at least one of the current cells is moved to a different location to create sufficient open space to place the ECO cell within the target region.

Other aspects include components, devices, systems, improvements, methods, processes, applications, computer readable mediums, and other technologies related to any of the above.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIGS. 3A-3D illustrate one method for ECO cell insertion.

DETAILED DESCRIPTION

Figure 1:
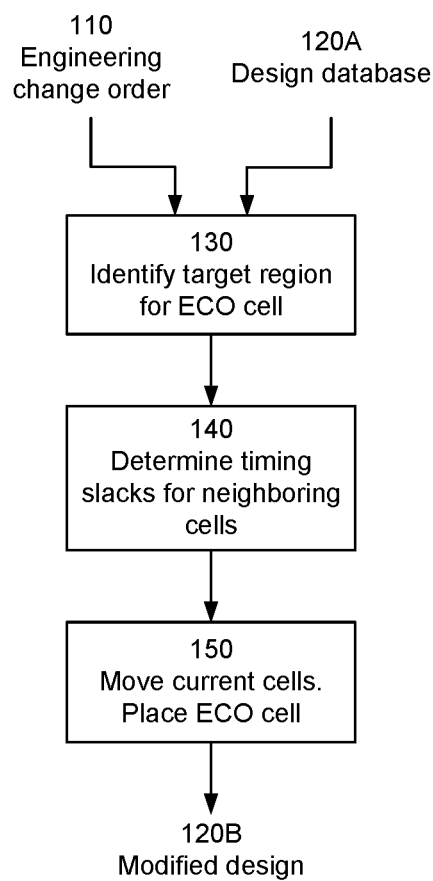
FIG. 1 depicts a flow diagram for carrying out an ECO.

Aspects of the present disclosure relate to timing and placement co-optimization for ECO (engineering change order) cells. ECOs are additions or changes to an integrated circuit design that occur late in the design process. Because it occurs late in the design process, the ECO step can be complicated and time-consuming since constraints can affect each other. In the ECO stage of chip design, it is important to fix timing violations without creating additional timing violations.

For example, an ECO may result in inserting an additional delay buffer (an ECO cell) along a timing path to increase a path delay in order to fix a hold timing violation. However, if the inserted buffer is displaced from the intended location, this may create a longer wire and longer path delay, resulting in additional setup timing violation for the timing path. One reason a buffer may be displaced is due to high cell density at the intended location. There may not be enough open space at the intended location to accommodate the additional buffer. If the additional delay buffer is inserted at the intended location, this may displace other current cells and create additional setup or other violations in other timing paths. However, if the additional delay buffer is not inserted at the intended location, that may also create additional setup or other violations in the timing path of interest.

This problem may be solved by timing and placement co-optimization, in which a timing system (timer) and a placement system (placer) work together to evaluate a possibility of moving current cells based on the available timing slack and thereby prevent timing degradation while opening up space for placement of the ECO cell. One aspect is an EDA architecture in which a timer and a placer work together, exchanging timing information from the timer and physical information from the placer to determine acceptable placements for the additional (ECO) cells and acceptable movements of current cells to create space for the additional ECO cells. Another aspect limits movement of current cells based on those cells' calculated timing slacks before movement, in order to reduce additional timing violations (e.g., not allowing movements that would allow the degradation of timing slacks to create additional timing violations).

In contrast, in another ECO approach, the placer and timer may work independently. For example, the objective of the placer is to find legal locations for ECO cells, often without considering timing changes caused by cell movement. Then, the timer analyzes timing based on the cell locations determined by the placer. If the timer determines additional timing violations, users repeat this process to fix ECOs addressing the additional timing violations until they remove all timing violations. However, this process may converge slowly or not at all.

In the co-optimized approach, the timer and placer are active together, in order for the timer to evaluate the cell movements that the placer would like to make and give feedback to the placer so that cell movement takes into consideration the cells' timing slacks and the effect of cell movement on the timing slack.

This approach can provide better quality of results because it can place cells in better locations by creating space for additional cells by moving their neighboring cells. It may also reduce the timing degradation caused by these moves, by containing cell displacements within distances allowed by the cells' timing slacks.

FIG. 1 depicts a flow diagram for carrying out an ECO. A design database 120A contains the current design of the integrated circuit, as well as additional information produced in the design process. For example, the design database 120A may contain a listing of constraints to be met by the design, including relevant metrics for the constraints and whether or not each constraint is met or violated by the current design. The ECO 110 calls for the insertion of an additional cell (referred to as the ECO cell) into the current design. A target region for the placement of the ECO cell is identified 130. However, there is insufficient open space within the target region to place the ECO cell. In order to make space, current cells are moved. To assess the potential for moving different cells, the timing slacks for current cells in the neighborhood of the target region are determined 140. The neighborhood could be the target region itself. Based on the timing slacks of the current cells, one or more of the current cells are moved 150 to different locations to create sufficient open space to place the ECO cell within the target region. The resulting modified design 120B has implemented the ECO without introducing additional timing violations.

The process shown in FIG. 1 is explained in more detail below using setup and hold timing constraints, but it should be understood that the disclosure is not limited to these constraints. Setup and hold constraints apply to timing paths within the integrated circuit. Each timing path has a start point, an end point and combinational logic circuits between the start point and end point. Examples of start points and end points include sequential logic circuits (e.g., a flop or other type of memory), primary inputs, and primary outputs.

Setup and hold constraints work in opposite directions. Setup constraints ensure that signal propagation through a timing path is not too slow for the circuit to operate properly. Hold constraints ensure that signal propagation is not too fast for the circuit to operate properly. As a result, fixing a setup constraint may introduce a violation of a hold constraint, and vice versa. In the examples below, the ECO fixes a hold violation (violation of a hold constraint) by inserting a delay buffer to slow down the signal propagation. However, due to the lack of open space, some of the current cells are moved to other locations. This typically introduces more delay in the timing paths through those cells, which may end up violating setup constraints for timing paths through those cells.

As used in this disclosure, "slack" is the amount by which a design exceeds the requirements for the design. For example, hold slack is the margin by which the design exceeds the hold timing constraint, and setup slack is the margin by which the design exceeds the setup timing constraint. If changes in a design increase this margin, the slack is "improved" or "better." Note that improving the slack may mean a more positive slack or a more negative slack, depending on the constraint. In the reverse direction, the slack is "degraded" or "worse." If a design meets a certain constraint with a certain amount of slack, but changes to the design degrade the slack, at some point the slack will degrade sufficiently to create a violation of the constraint.

Figure 2B:
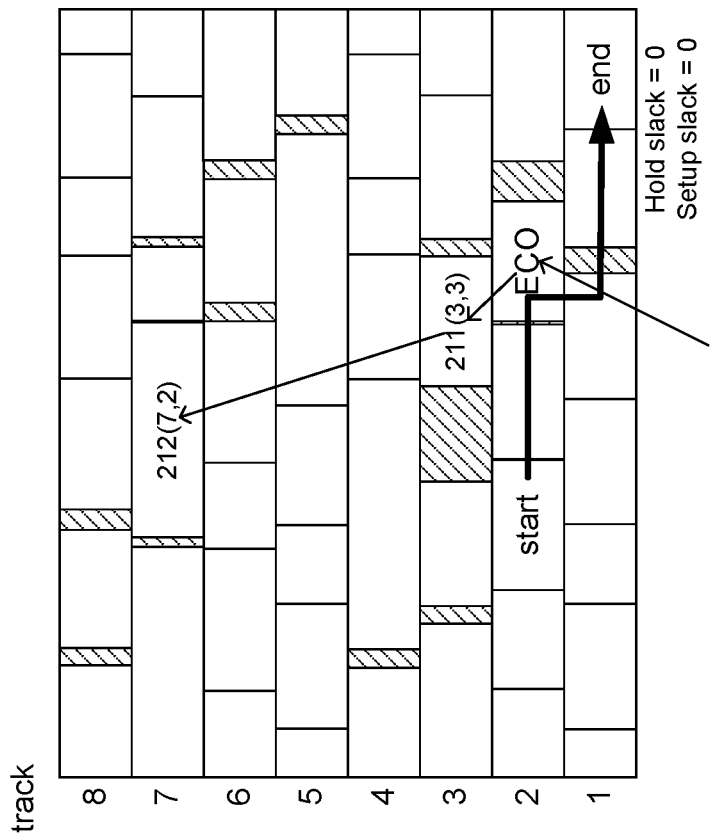
FIGS. 2A and 2B illustrate additional buffer insertion to fix a hold violation.
Figure 2A:
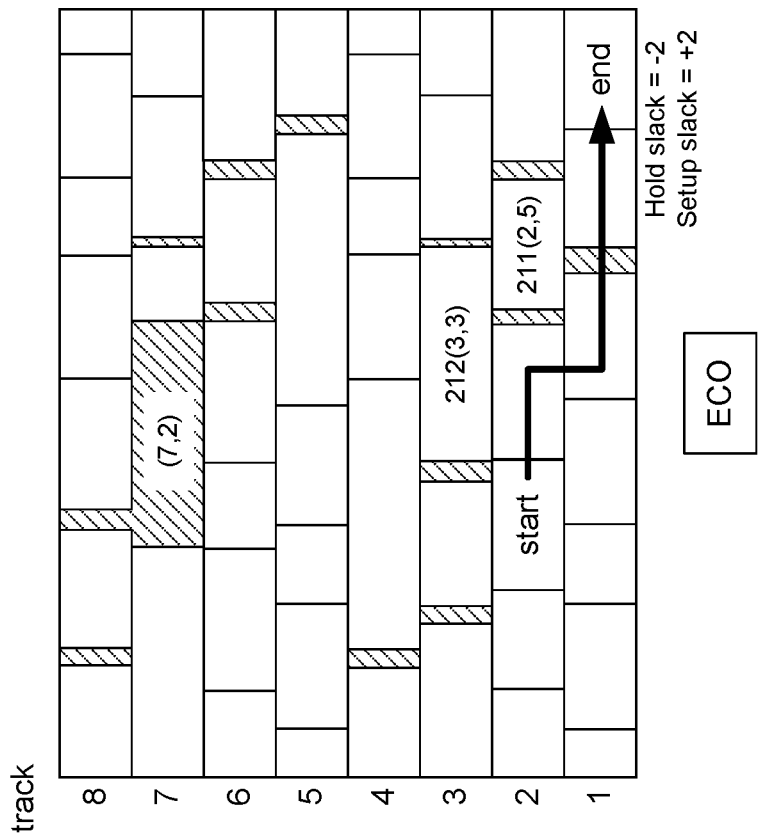

FIGS. 2A and 2B illustrate additional buffer insertion to fix a hold violation. In these figures, each white rectangle represents a cell in the integrated circuit design. The cross-hatched areas are open spaces that are not occupied. The cells are arranged in "tracks," labelled as tracks 1-8. When relevant, cells will be referred to by reference numbers or other labels, and spatial positions will be referred to by coordinates (j,k), where j is the track number and k is the position within that track. For example, in FIG. 2A, cell 211 is in track 2 and is the 5th cell in that track, so cell 211 is currently located at (2,5). Similarly, cell 212 is the 3rd cell in track 3 so it is located at (3,3). The location (7,2) is currently an open space.

FIG. 2A shows the current design before implementation of the ECO. A timing path is shown by the heavy arrow, beginning from cell "start", traversing through three cells, and ending at cell "end". This timing path has hold slack=−2 and setup slack=+2. In these examples, negative slacks are violations. The timing path has a hold violation but meets the setup constraint. The ECO wants to fix the hold violation by inserting a delay buffer, labeled as "ECO", that introduce a delay of +2. If the ECO cell can be placed with a delay of +2, then the hold slack will be improved to 0, fixing the hold violation. The setup slack will degrade to 0, but that is still acceptable since it does not create an additional setup violation. However, the only open space is located at (7,2). This is too far away from the timing path. Placing the ECO cell at (7,2) will introduce a delay of +7 due to the long routing length. Placing the ECO cell at (7,2) fixes the hold violation but causes a additional setup violation.

FIG. 2B shows the final implementation of the ECO, which involves moving cells 211 and 212. ECO cell is placed at (2,5), which is the previous location of cell 211. Cell 211 is moved to (3,3), which is the previous location of cell 212. Cell 212 is moved to (7,2). Cells 211 and 212 are moved because they have enough excess slack to accommodate the move without creating an additional violation. Cell 212 had a setup slack=+8, the move introduces a delay of +6, so the post-move setup slack=+2, which still satisfies the setup constraint. Cell 211 had a setup slack=+3, the move introduces a delay of +2, so the post-move setup slack=+1. This opens location (2,5), where the ECO cell may be placed to add delay of +2 to the timing path.

Figure 3D:
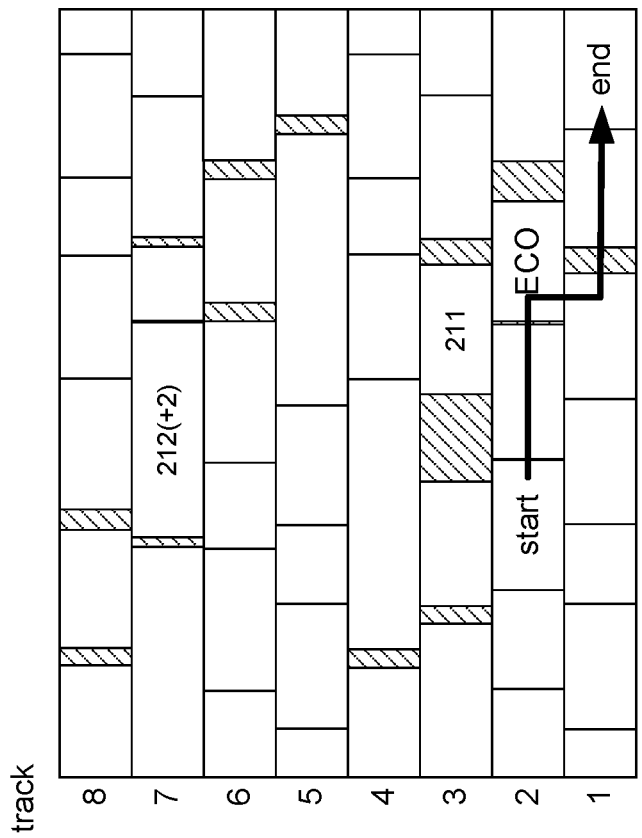
Figure 3C:
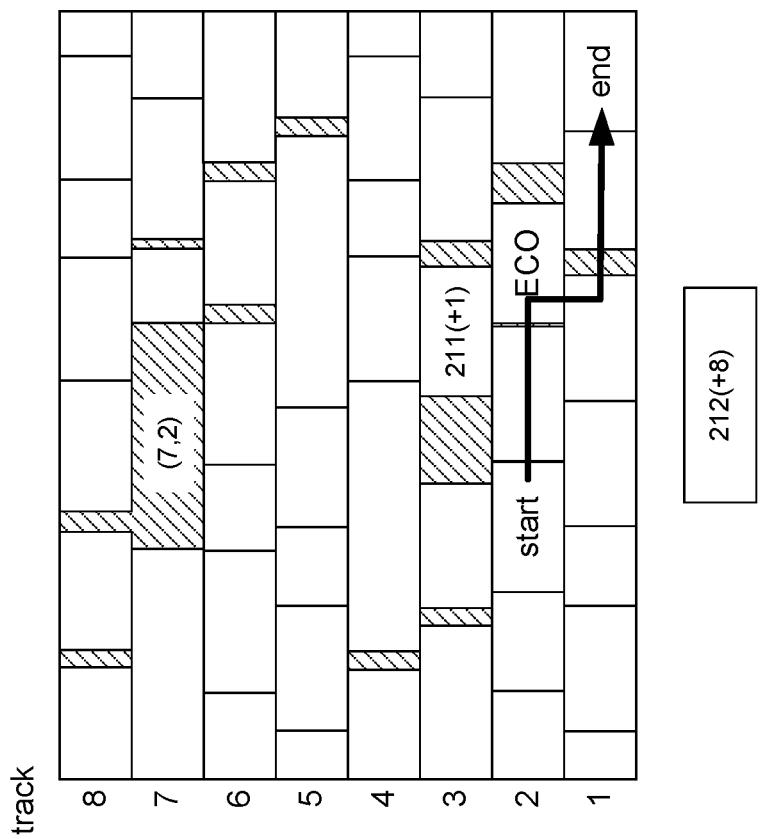
Figure 4:
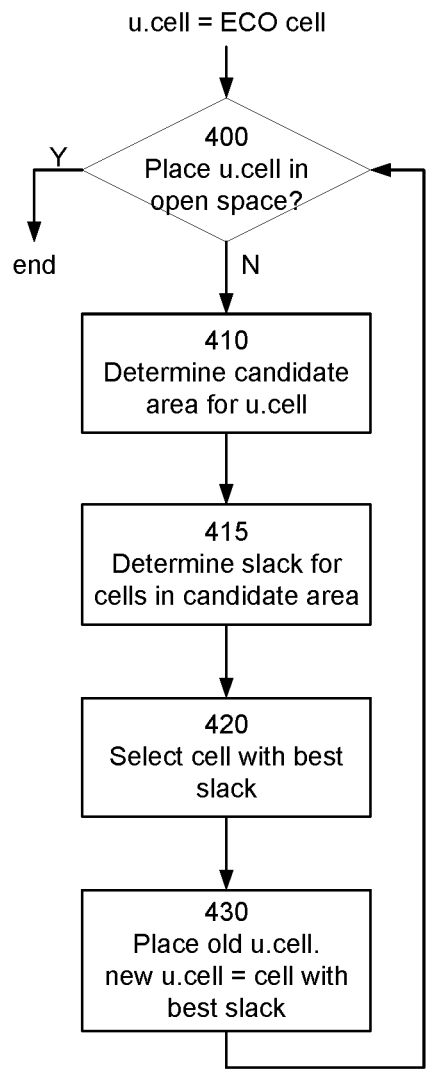
FIG. 4 depicts a flow diagram for the method of FIGS. 3A-3D.

FIGS. 3-4 and FIGS. 5-6 show two different approaches to move from the ECO request of FIG. 2A to the ECO solution of FIG. 2B. In FIG. 2B, there is a chain of moves shown by the light arrows. In a first move in the chain, ECO cell is moved into (2,5). In a second intermediate move, cell 211 is moved from (2,5) to (3,3). In the last move in the chain, cell 212 is moved from (3,3) to open space (7,2). This chain has one intermediate move for three total moves, but chains may have any number of intermediate moves, including zero intermediate moves. In the approach of FIGS. 3-4, this chain is constructed sequentially beginning with the first move and ending with the last move, by placing cells. The ECO cell is placed but this displaces cell 211; cell 211 is placed but this displaces cell 212; until finally cell 212 is placed into the open space (7,2). In the approach of FIGS.

5-6, the chain is constructed in the opposite direction, beginning with the last move and ending with the first move. The construction is based on moving the open space. Open space (7,2) is moved to (3,3); open space (3,3) is moved to (2,5), until finally the ECO cell is placed into the open space (2,5).

FIGS. 3A-3D illustrate the approach based on placing cells and FIG. 4 depicts the corresponding flow diagram. In this approach, each iteration places an unplaced cell (u.cell in FIG. 4) until finally the u.cell is placed in an open space. FIG. 4 begins with u.cell=ECO cell. In FIG. 3A, this is represented by the ECO cell shown outside the tracks. If the u.cell can be placed in an open space 400, then it is placed and the ECO implementation is completed. Otherwise, a candidate area for the u.cell is determined 410. In FIG. 3A, the candidate area includes the locations where the ECO cell could be placed in a manner that fixes the hold violation. It is the target region for the ECO cell. These locations are currently occupied by cells 211, 311, 312. If one of these cells was moved, the ECO cell could then be placed in the vacated space. One of the cells is selected for moving based on their timing slacks. In this example, timing slacks for the cells are determined 415 and the cell with the most excess slack is selected 420 for moving. In FIG. 3A, the number in parenthesis indicates the setup slack for the candidate cells. Cell 211 has setup slack=+3, cell 311 has setup slack=+1, and cell 312 has setup slack=0. Here, it is assumed that moving the cell will increase delay, which is why setup slack is considered. Cell 211 has the best setup slack and so may be moved a longer distance without creating a setup violation. As shown in FIG. 3B, the u.cell (ECO cell) is placed 430 at the current location of cell 211, and cell 211 becomes the current u.cell.

The process is repeated for the current u.cell 211 of FIG. 3B. U.cell 211 does not have sufficient slack to move to the open space. The candidate area for u.cell 211 is the locations to which cell 211 could be moved, without reducing the setup slack from +3 to below 0. In other words, the distance by which the u.cell 211 may be moved is based on, and in this case is limited by, the timing slack of the u.cell. In one approach, a maximum move distance is determined based on the timing slack, and current cells within this maximum move distance are considered. In FIG. 3B, the candidate area for u.cell 211 is currently occupied by cells 313-319, 212. Cells 311 and 312 also fall in this area, but they are not considered because they were rejected in the previous iteration. Of the candidate cells, cell 212 is the cell with the best setup slack. As shown in FIG. 3C, u.cell 211 displaces cell 212, which becomes the next u.cell. Moving u.cell 211 to its subsequent location degrades its setup slack from +3 to +1 as shown in FIG. 3C.

This process is repeated for current u.cell 212. In this case, u.cell 212 has sufficient slack to be moved to open space (7,2), but with setup slack degraded from +8 to +2. So u.cell 212 is placed at (7,2), as shown in FIG. 3D.

Figure 5B:
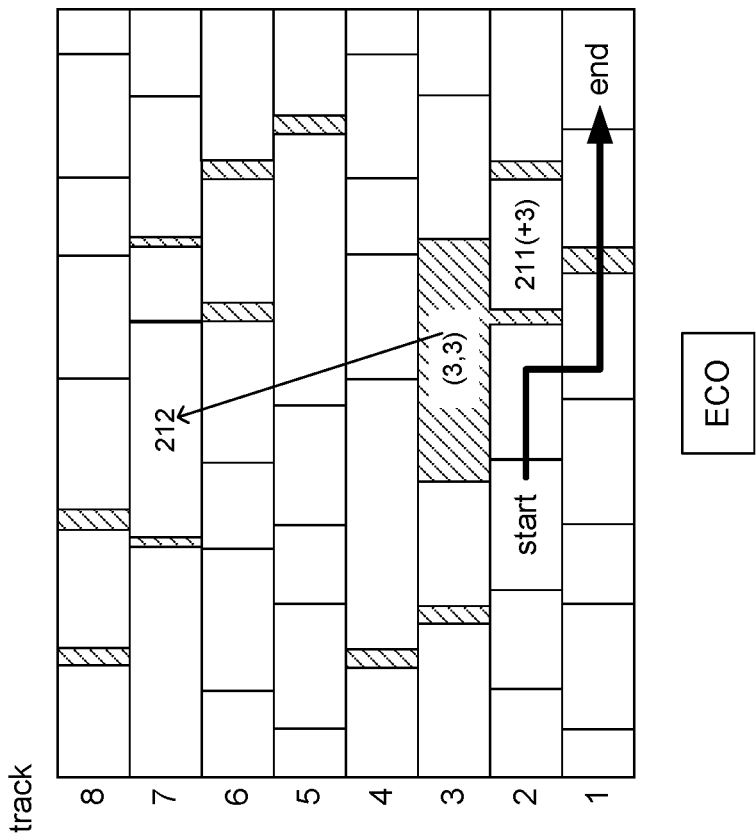
FIGS. 5A-5D illustrate another method for ECO cell insertion.
Figure 5A:
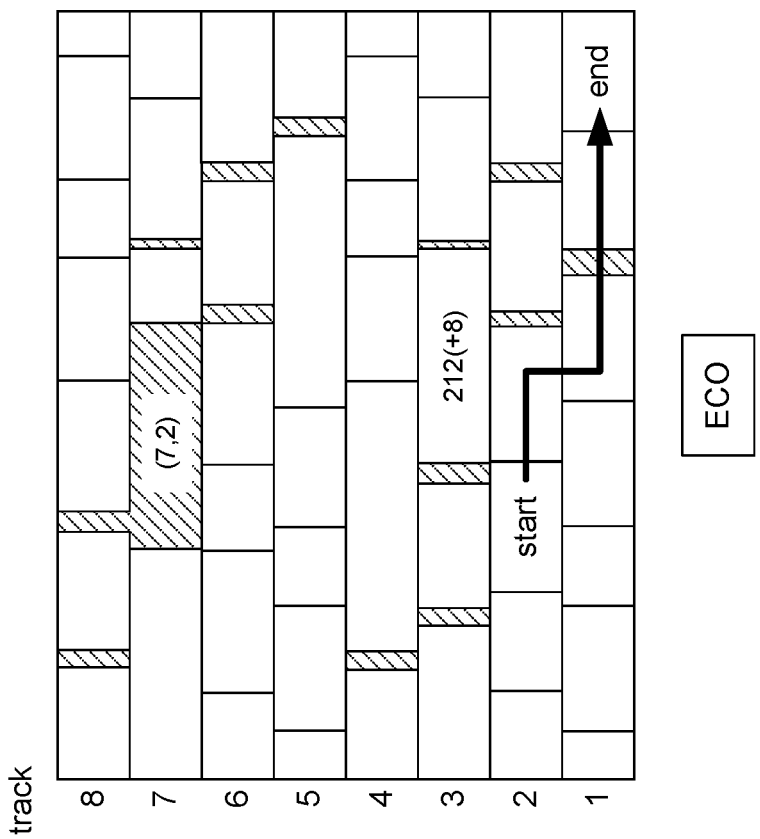
Figure 5D:
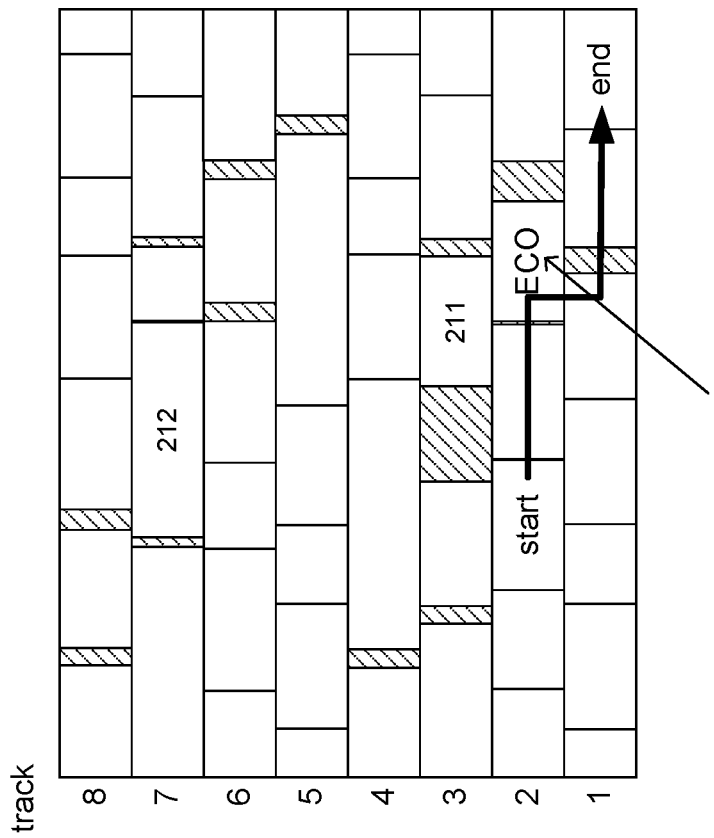
Figure 5C:
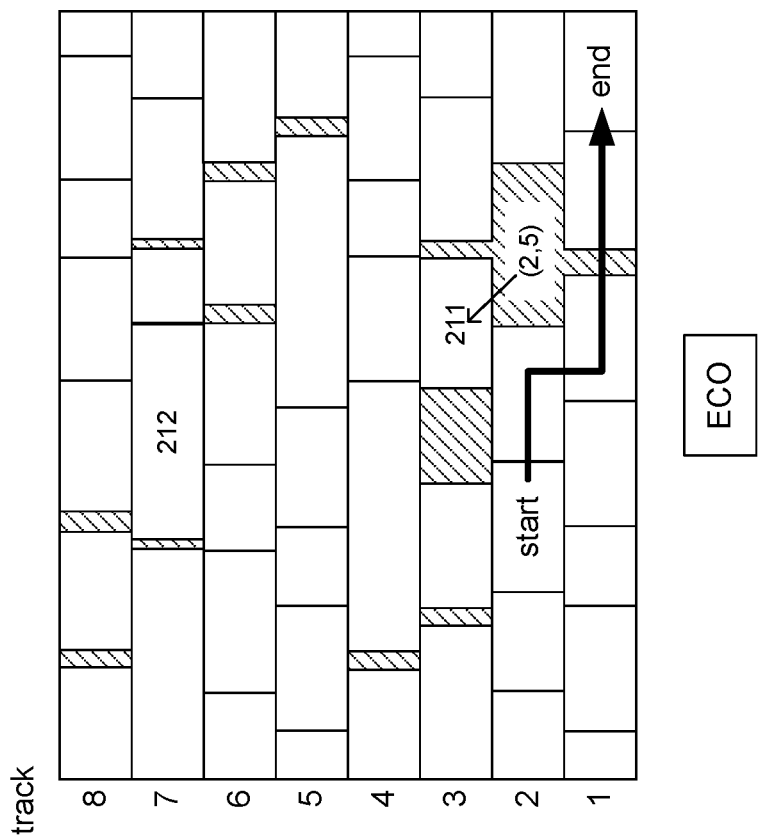
Figure 6:
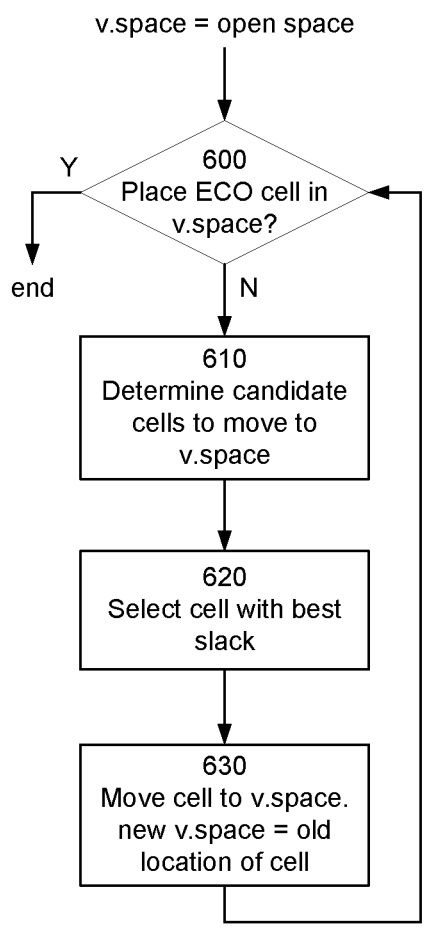
FIG. 6 depicts a flow diagram for the method of FIGS. 5A-5D.

In FIGS. 3-4, construction of the chain of moves for placing the ECO cell begins by placing the ECO cell which displaces a current cell, and eventually ends by moving a u.cell into an open space. In FIGS. 5-6, the chain of moves is constructed by taking the dual approach. The construction begins by moving a current open space to create an additional open space, and eventually ends by moving an open space to a location where the ECO cell can be placed. FIGS. 5A-5D illustrate this approach and FIG. 6 depicts the corresponding flow diagram. In FIG. 6, the current open space is referred to as v.space (vacant space).

FIG. 6 begins with v.space=open space (7,2). If the ECO cell can be placed in the current v.space 600, then it is placed and the ECO implementation is completed. Otherwise, candidate cells that may be moved into v.space are determined 610 based on their timing slacks. This can also be thought of as considering possible moves for the v.space to other locations. The candidate cells must have sufficient setup slack that moving the cell to open space (7,2) will not create a setup violation. Of these candidate cells, the one with the best slack is selected 620. In FIG. 5A, this is cell 212 with setup slack=+8. As shown in FIG. 5B, cell 212 is moved 630 to the current v.space (7,2). This creates a new open space at the prior location of cell 212, which becomes the current v.space (3,3).

The process is then repeated to 600 for the current v.space (3,3). The ECO cell cannot be successfully placed at this location. As shown in FIG. 5C, cell 211 with setup slack=+3 is moved to v.space (3,3). This creates v.space (2,5). ECO cell can be placed at this location, as shown in FIG. 5D.

FIGS. 3-6 are examples that illustrate certain approaches and principles. Other variations will be apparent. For example, the two approaches may be combined, using the u.cell concept for some ECOs and the v.space concept for other ECOs, depending on the local configuration of current cells for that ECO. They may also be combined in implementing a single ECO, with the vacant space moving towards the desired location for the ECO cell and the unplaced cell also moving towards the open space, so that the two meet somewhere in the middle. As another example, both approaches may be used and the better solution implemented.

For clarity, the examples above take one step at a time. The chain of moves was constructed sequentially by selecting one move at a time, beginning at one end of the chain and ending at the other end of the chain. However, this is not a limitation. Different alternative paths may be explored simultaneously, for example using branching and pruning techniques. In FIG. 3A, rather than immediately selecting cell 211 and rejecting cells 311 and 312, alternative chains through all three cells may be considered. Even cell 312, which has setup slack=0, may be explored if the possible moves do not degrade the setup slack. Thus, there may be three branches, one for each cell 211, 311, 312, rather than just a single branch for cell 211. The branches may be pruned as they are explored, rather than exhaustively considering every possibility of every branch. The same is true for FIG. 5A. There may be more than one open space in the neighborhood of the target region for the ECO cell. Chains to multiple open spaces may be explored, rather than selecting just one open space or selecting just one possible cell move at each step.

Furthermore, in the examples of FIGS. 3-6, the selection of cell to be moved (steps 420, 620) was based on picking the cell with the most excess slack. In other embodiments, the selection process may be based on different or additional criteria. For example, in FIG. 3, the selection may also be based on moving the u.cell closer to an open space and, in FIG. 5, the selection may also be based on moving the v.space closer to the target region for the ECO cell.

Figure 7A:
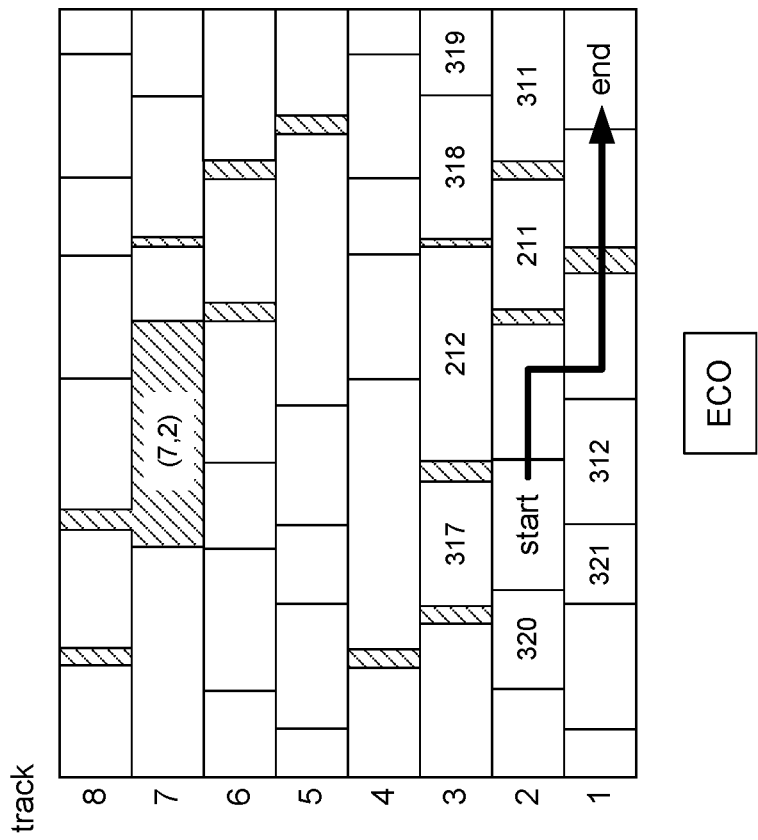
FIGS. 7A-7B illustrate another method for ECO cell insertion.
Figure 7B:
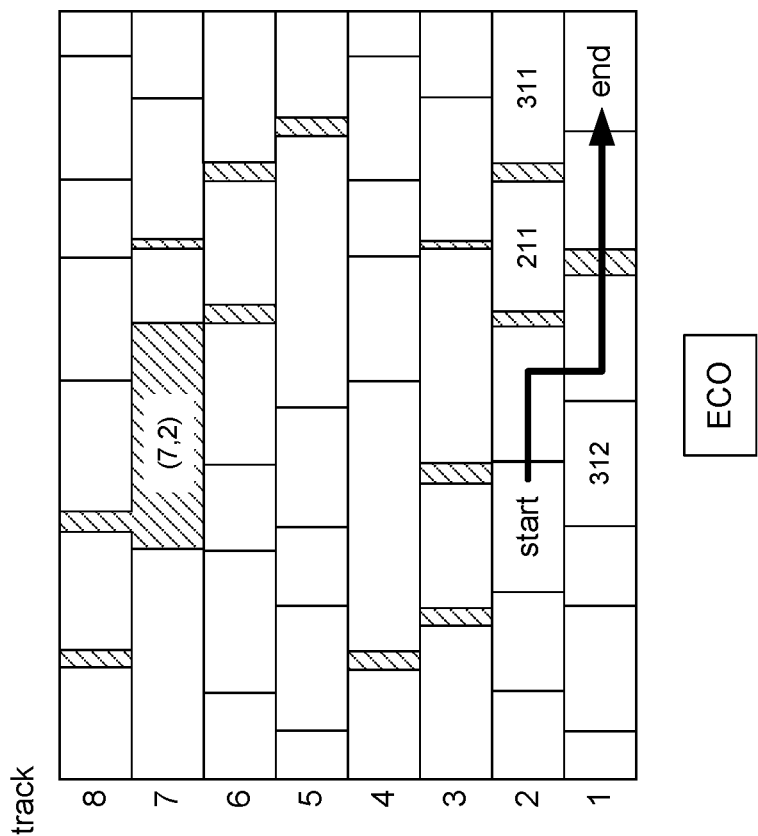

FIGS. 7A-7B show a variant of the approach of FIGS. 5-6. In FIG. 7A, the target region of acceptable placements of the ECO cell is identified. This includes cells 211, 311-312. However, none of these cells has sufficient excess slack to move to the open space (7,2). In FIG. 7B, the search area is expanded to neighboring areas to also include cells 212, 317-321. Cell 212 has sufficient slack to move to the open space, so it is moved. This creates an open space (3,3), which is filled by repeating the process. As an alternative, all of the cells within an N×N neighborhood of the desired ECO placement may be considered in the initial search. This approach takes into account that the v.space should move in a direction towards the target region of the ECO cell, since the goal is to move the v.space into the target region.

The description above used setup and hold timing constraints as examples. However, the approach is not limited to these constraints. For example, within timing, maximum capacitance and maximum transition time constraints may also be considered. These constraints are similar to setup constraints, in that these constraints typically degrade with increased routing length. Another example is power optimization constraints. Increasing wire length typically increases power consumption.

Figure 8:
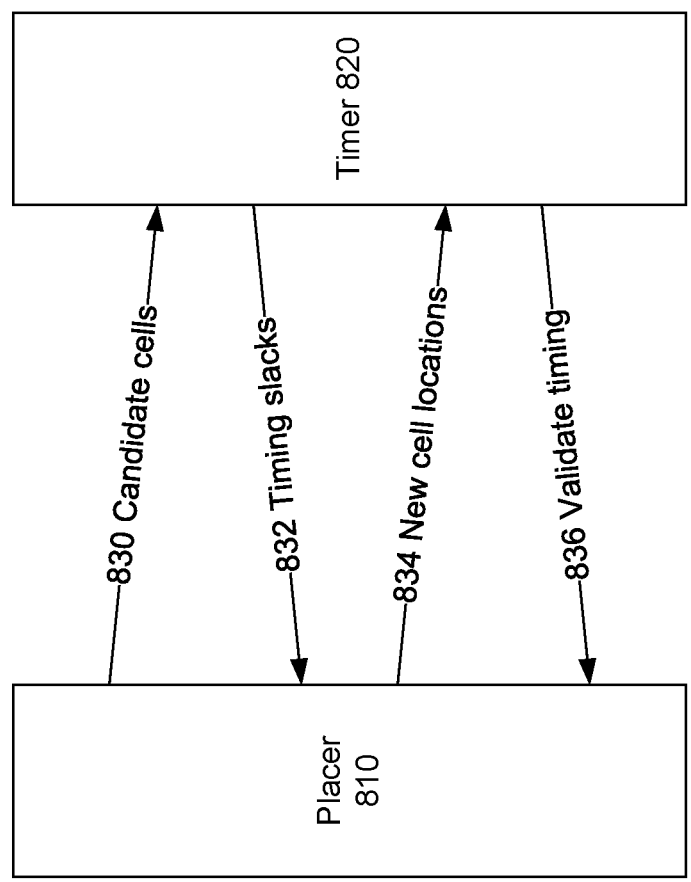
FIG. 8 illustrates a timer and placer co-optimization architecture.

FIG. 8 illustrates a timer and placer co-optimization architecture. EDA systems may have separate timing and placement tools and these tools may be used separately from each other, particularly in earlier stages of integrated circuit design. FIG. 8 illustrates an architecture in which these tools work together to handle both timing and placement constraints for ECOs. In this architecture, placement and timing information is exchanged between the placer 810 and the timer 820. The placer 810 sends a request 830 to the timer 820 asking for timing information of the current cells being considered to move. The timer sends 832 back the timing slacks to the placer so that placer can move the cells based on available timing slacks. Once the cells are moved, the placer sends the new cell locations 834 to the timer, which evaluates timing based on the new locations. This is sent 836 as feedback to the placer so that the placer can adjust the placements as necessary to meet timing constraints. Tools other than timers may also be used. For example, timer 820 may be replaced by a power optimization tool, if the constraint of interest relates to power consumption rather than timing.

Figure 9:
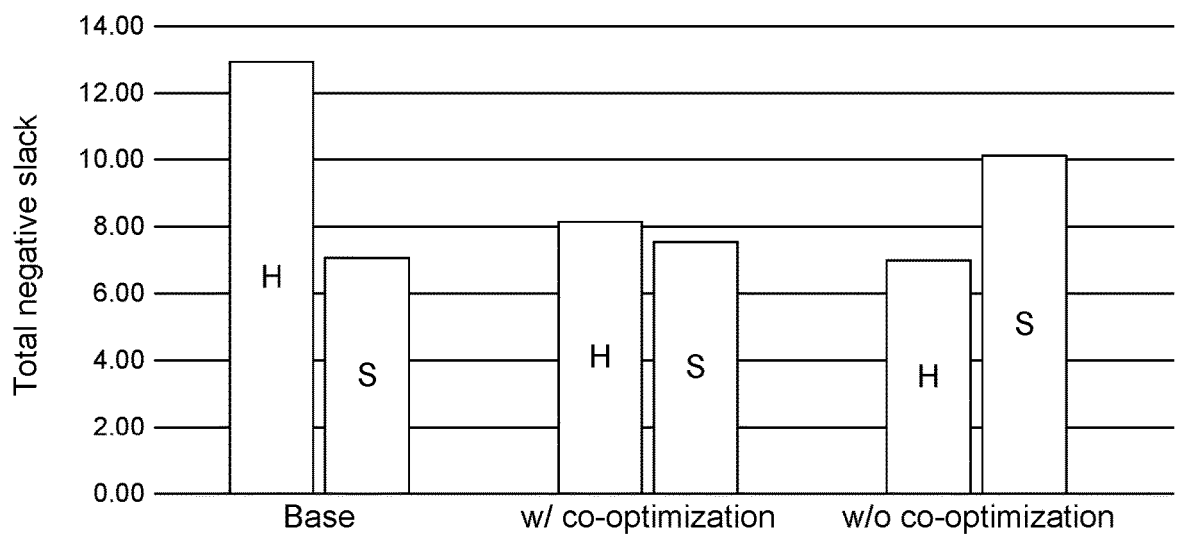
FIGS. 9 and 10 are bar charts comparing ECO cell insertion with and without co-optimization.

FIG. 9 illustrates the advantage of co-optimization over no co-optimization. The y-axis is the total negative slack, so larger numbers are worse. In each pair of bars, the left bar labeled "H" is the total hold timing slack and the right bar labeled "S" is the total setup timing slack. "Base" is the current design before the ECO cells are added. "w/co-optimization" shows the timing slacks after ECO cells are placed using the approach described above. "w/o co-optimization" shows the timing slacks using an approach without co-optimization. The approach without co-optimization creates additional setup timing violations due to large cell displacements. The placer is operating without regard to timing. In contrast, the co-optimization approach limits degradation of setup timing slack by moving neighboring cells with large excess setup timing slacks.

Figure 10:
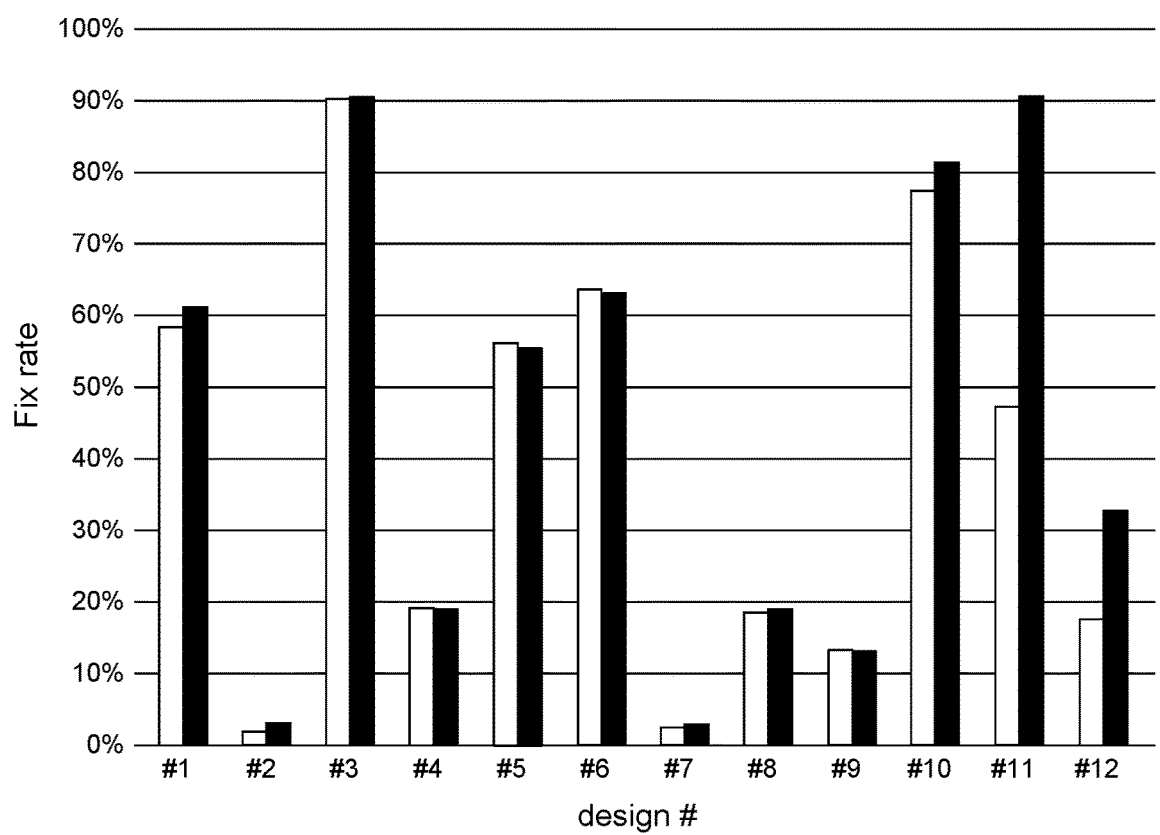

FIG. 10 shows setup fix rate comparison with and without co-optimization. The y-axis is the fix rate, as a percentage. Fix rate is a measure of how many violations are fixed (how many ECOs are implemented) without creating additional violations. 100% fix rate is the best and 0% fix rate is the worst. Each pair of bars is for a different integrated circuit design. In each pair, the left white bar shows the fix rate without co-optimization and the right black bar shows the fix rate with co-optimization. The co-optimization approach performs the same or better in nearly all test cases, sometimes fairly significantly better.

Figure 11:
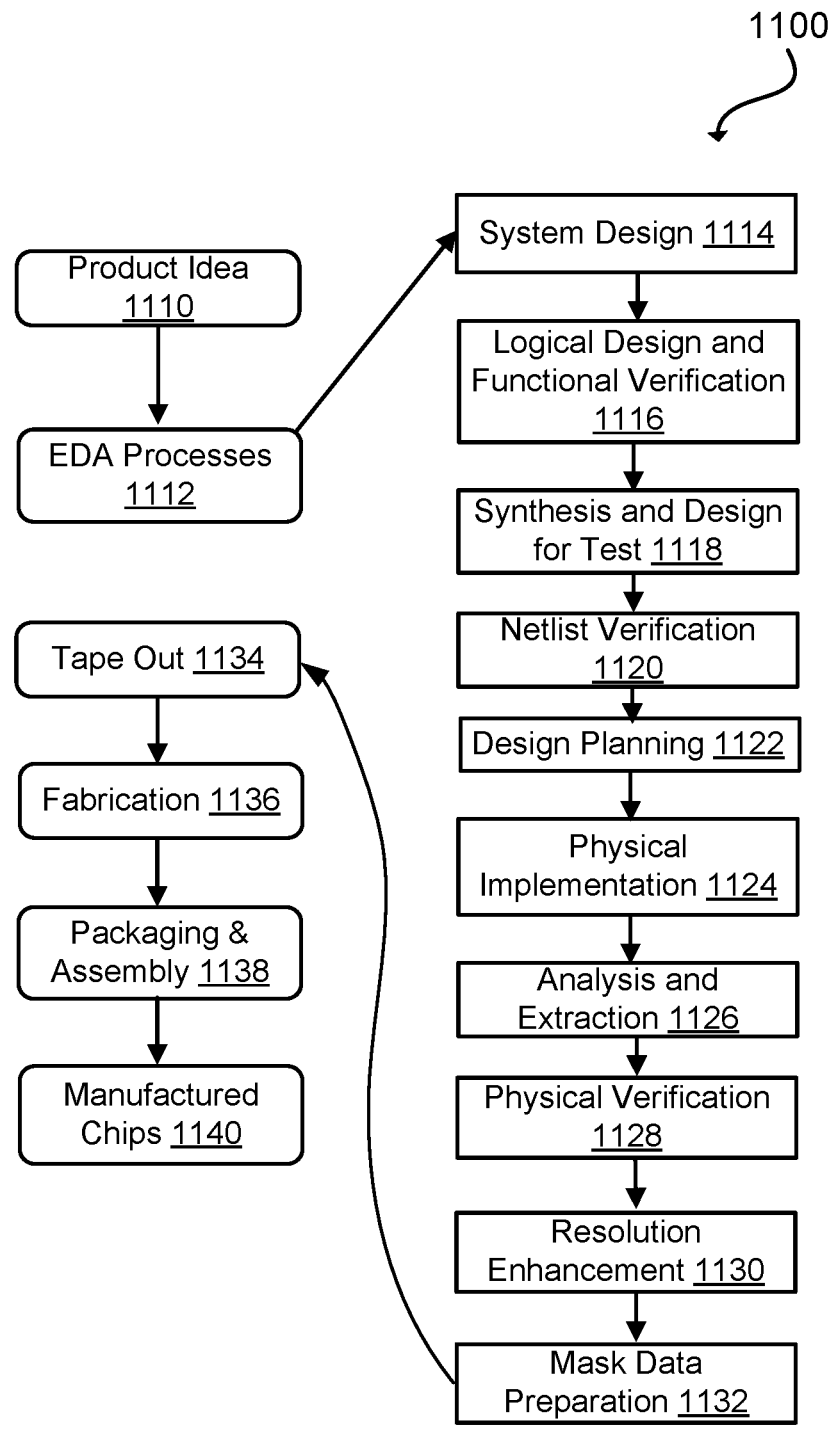
FIG. 11 depicts a flowchart of various processes used during the design and manufacture of an integrated circuit in accordance with some embodiments of the present disclosure.

FIG. 11 illustrates an example set of processes 1100 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1110 with information supplied by a designer, information which is transformed to create an article of manufacture that uses a set of EDA processes 1112. When the design is finalized, the design is taped-out 1134, which is when artwork (e.g., geometric patterns) for the integrated circuit is sent to a fabrication facility to manufacture the mask set, which is then used to manufacture the integrated circuit. After tape-out, a semiconductor die is fabricated 1136 and packaging and assembly processes 1138 are performed to produce the finished integrated circuit 1140.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 11. The processes described by be enabled by EDA products (or tools).

During system design 1114, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1116, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1118, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1120, the netlist is checked for compliance with timing constraints and for correspondence with the HDL code. During design planning 1122, an overall floor plan for the integrated circuit is constructed and analyzed for timing and top-level routing.

During layout or physical implementation 1124, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1126, the circuit function is verified at the layout level, which permits refinement of the layout design. During physical verification 1128, the layout design is checked to ensure that manufacturing constraints are correct, such as DRC constraints, electrical constraints, lithographic constraints, and that circuitry function matches the HDL design specification. During resolution enhancement 1130, the geometry of the layout is transformed to improve how the circuit design is manufactured.

During tape-out, data is created to be used (after lithographic enhancements are applied if appropriate) for production of lithography masks. During mask data preparation 1132, the 'tape-out' data is used to produce lithography masks that are used to produce finished integrated circuits.

A storage subsystem of a computer system (such as computer system 1200 of FIG. 12) may be used to store the programs and data structures that are used by some or all of the EDA products described herein, and products used for development of cells for the library and for physical and logical design that use the library.

Figure 12:
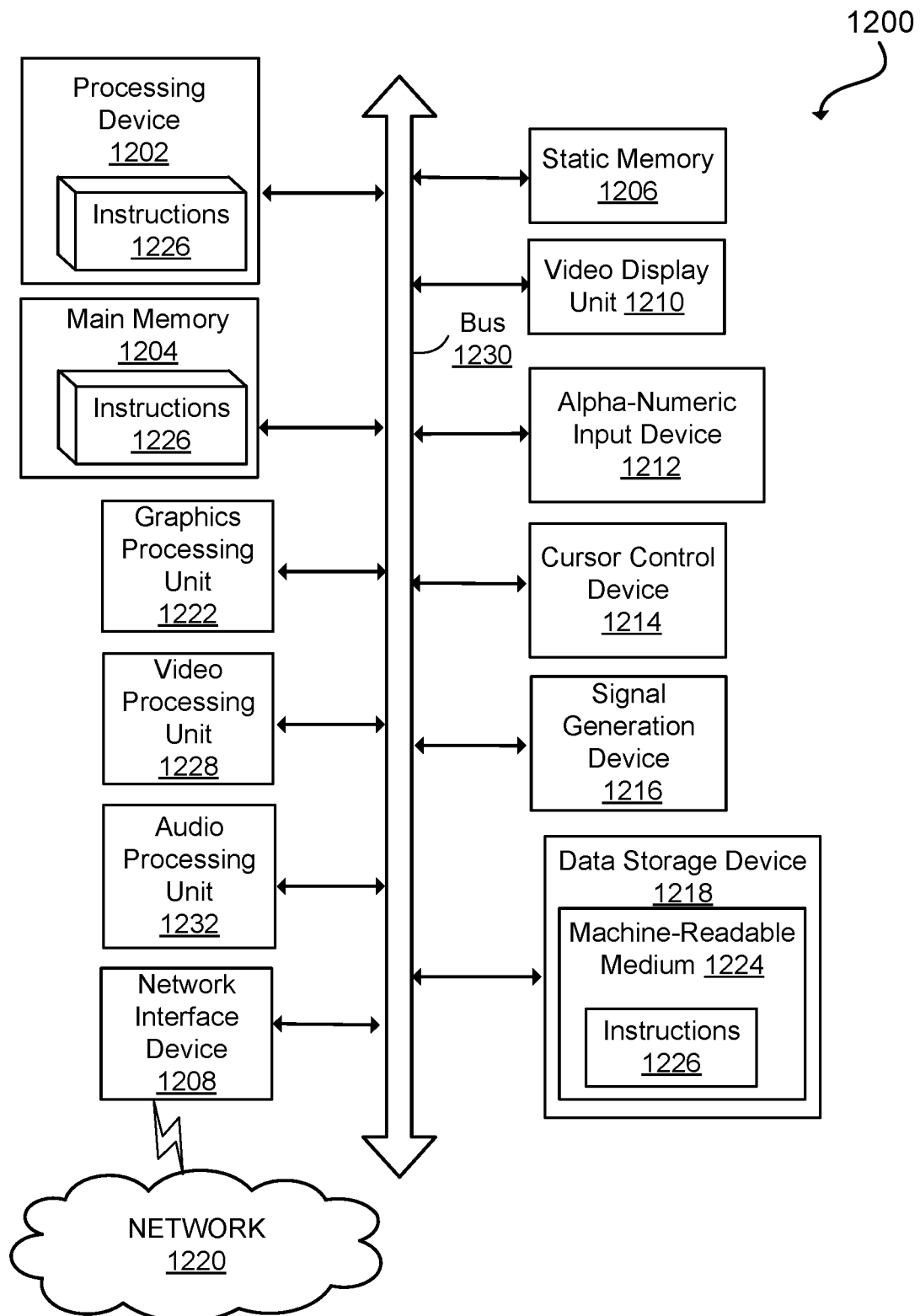
FIG. 12 depicts a diagram of an example computer system in which embodiments of the present disclosure may operate.

FIG. 12 illustrates an example machine of a computer system 1200 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM), a static memory 1206 (e.g., flash memory, static random access memory (SRAM), etc.), and a data storage device 1218, which communicate with each other via a bus 1230.

Processing device 1202 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 may be configured to execute instructions 1226 for performing the operations and steps described herein.

The computer system 1200 may further include a network interface device 1208 to communicate over the network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a graphics processing unit 1222, a signal generation device 1216 (e.g., a speaker), graphics processing unit 1222, video processing unit 1228, and audio processing unit 1232.

The data storage device 1218 may include a machine-readable storage medium 1224 (also known as a non-transitory computer-readable medium) on which is stored one or more sets of instructions 1226 or software embodying any one or more of the methodologies or functions described herein. The instructions 1226 may also reside, completely or at least partially, within the main memory 1204 and/or within the processing device 1202 during execution thereof by the computer system 1200, the main memory 1204 and the processing device 1202 also constituting machine-readable storage media.

In some implementations, the instructions 1226 include instructions to implement functionality corresponding to the present disclosure. While the machine-readable storage medium 1224 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1202 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   accessing an engineering change order (ECO) for a current design of an integrated circuit, the ECO inserting an ECO cell among placed and routed current cells of the current design;
   identifying a target region in the current design for placement of the ECO cell;
   determining timing slacks for current cells in a neighborhood of the target region; and
   based on the timing slacks of the current cells, moving at least one of the current cells to a different location to place the ECO cell within the target region;
   wherein the ECO cell is a buffer; the ECO fixes a violation of a hold timing constraint for a timing path by inserting the buffer along the timing path; the timing slacks for the current cells are timing slacks that degrade by increasing routing length for the current cells; and moving the at least one current cell to the different location is based on not degrading the timing slack so much as to create an additional timing violation for the moved cell.

2. The method of claim 1 wherein the timing slacks for the current cells comprise at least one of a setup timing slack, a maximum capacitance slack, or a maximum transition time slack.

3. The method of claim 1 wherein moving the at least one current cell comprises:
   selecting the at least one current cell based on which current cells in the neighborhood have more timing slack; and
   moving the selected current cell to the different location.

4. The method of claim 3 wherein the selected current cell comprises the current cell in the neighborhood with the best timing slack.

5. The method of claim 1 wherein the distance by which the at least one current cell is moved is based on the timing slack of the current cell.

6. The method of claim 5 wherein moving the at least one current cell comprises:
   determining a maximum movement distance based on the timing slack of the current cell; and
   moving the at least one current cell by not more than the maximum movement distance.

7. A non-transitory computer readable medium comprising stored instructions, which when executed by a processor, cause the processor to:
   access an engineering change order (ECO) for a current design of an integrated circuit, the ECO inserting an ECO cell among placed and routed current cells of the current design;
   identifying a target region in the current design for placement of the ECO cell, but wherein the target region has insufficient open space to place the ECO cell;
   determining slacks for current cells between the target region and current open spaces in the current design; and
   based on the slacks of the current cells, construct a chain of moves comprising:
      a first move comprising placing the ECO cell at a location within the target region, thus displacing a current cell; and
      a last move comprising moving a current cell displaced in the next-to-last move to one of the current open spaces;

wherein the ECO cell is a buffer; the ECO fixes a violation of a hold timing constraint for a timing path by inserting the buffer along the timing path; the timing slacks for the current cells are timing slacks that degrade by increasing routing length for the current cells; and each move in the chain of moves is based on not degrading the timing slack so much as to create an additional timing violation for the moved cell.

8. The non-transitory computer readable medium of claim 7 wherein the chain of moves further comprises:
one or more intermediate moves comprising moving a current cell displaced in a previous move to a different location, thus displacing another current cell.

9. The non-transitory computer readable medium of claim 7 wherein constructing the chain of moves comprises sequentially constructing the chain beginning with the first move and ending with the last move.

10. The non-transitory computer readable medium of claim 7 wherein constructing the chain of moves comprises sequentially constructing the chain beginning with the last move and ending with the first move.

11. The non-transitory computer readable medium of claim 7 wherein constructing the chain of moves comprises constructing the chain sequentially by selecting one move at a time, beginning at one end of the chain and ending at the other end of the chain.

12. The non-transitory computer readable medium of claim 7 wherein constructing the chain of moves comprises: considering multiple alternative chains, and selecting from among the multiple alternative chains.

13. A system comprising:
a memory storing instructions; and
a processor, coupled with the memory and to execute the instructions, the instructions when executed cause the processor to:
access an engineering change order (ECO) for a current design of an integrated circuit, the ECO inserting an ECO cell among placed and routed current cells of the current design;
identify a target region in the current design for placement of the ECO cell;
determine slacks for current cells in a neighborhood of the target region; and
based on the slacks of the current cells, moving at least one of the current cells to a different location to create sufficient open space to place the ECO cell within the target region;
wherein the ECO cell is a buffer; the ECO fixes a violation of a hold timing constraint for a timing path by inserting the buffer along the timing path; the timing slacks for the current cells are timing slacks that degrade by increasing routing length for the current cells; and moving the at least one current cell to the different location is based on not degrading the timing slack so much as to create an additional timing violation for the moved cell.

14. The system of claim 13 wherein the instructions comprise a first set of executable instructions for placement of cells and a second set of executable instructions for determining the slacks, wherein the instructions cause the processor to exchange cell placement information and slack information between the two sets of executable instructions.

15. The system of claim 13 wherein the slacks for the current cells comprise at least one of a setup timing slack, a maximum capacitance slack, a maximum transition time slack, and a power optimization slack.

16. The method of claim 1 further comprising:
based on the timing slacks of the current cells, constructing a chain of moves comprising:
a first move comprising placing the ECO cell at a location within the target region, thus displacing one of the current cells; and
a last move comprising moving another one of the current cells displaced in the next-to-last move to one of the current open spaces.

17. The method of claim 16 wherein the chain of moves further comprises:
one or more intermediate moves comprising moving a current cell displaced in a previous move to a different location, thus displacing another current cell.

18. The method of claim 16 wherein constructing the chain of moves comprises sequentially constructing the chain beginning with the first move and ending with the last move.

19. The method of claim 16 wherein constructing the chain of moves comprises sequentially constructing the chain beginning with the last move and ending with the first move.

20. The method of claim 16 wherein constructing the chain of moves comprises: considering multiple alternative chains, and selecting from among the multiple alternative chains.

* * * * *